United States Patent Office 3,733,342
Patented May 15, 1973

3,733,342
SEPARATION OF ACIDS
Bertram Yeomans, Hessle, England, assignor to BP
Chemicals Limited, London, England
No Drawing. Filed Dec. 14, 1970, Ser. No. 98,006
Claims priority, application Great Britain, Dec. 17, 1969,
61,393/69
Int. Cl. C09f 5/10
U.S. Cl. 260—419                                    11 Claims

ABSTRACT OF THE DISCLOSURE

Di-neo acids and mono-neo acids are separated by treating a solution containing mono- and di-neo acids in a water-immiscible organic solvent with an aqueous alkaline solution to extract the di-neo acid.

---

Di-neo carboxylic acids may be produced by reaction of an $\alpha,\omega$-diisoalkyl substituted olefin, in which there are at least 3 carbon atoms between the isoalkyl groups, with formic acid in the presence of concentrated sulphuric acid or carbon monoxide in the presence of a mineral or Lewis acid which may be concentrated sulphuric acid. Together with the di-neo-acid there is formed an isoparaffin and frequently a mono-neo-carboxylic acid. For example when 2,7-dimethyloctene-4 is reacted with formic acid or carbon monoxide in the presence of concentrated sulphuric acid, the products include 2,2,7,7-tetramethylsuberic acid, hereinafter referred to as (TMS), 2,2,7-trimethyloctanoic acid, hereinafter referred to as (TMO), and 2,7-dimethyloctane. The TMS may be precipitated from the concentrated sulphuric acid by the addition of water but the mother liquor may still contain 10% to 20% w./w. of TMS based on the TMO present.

Such a process is described in U.S. Ser. No. 835,778, filed June 23, 1969 (corresponding to British patent application 31,228/68 cognate) and Belgian Pat. 735,340. TMS is the desired product. It would be desirable if it could be separated from the TMO in the mother liquor. Furthermore the mono-neo-acids such as TMO can be converted in a rearrangement reaction to di-neo-acids such as TMS by treatment with sulphuric acid as disclosed in U.S. Ser. No. 856,204, filed Sept. 8, 1969 (corresponding to British patent application 43,843/68). It is preferred that the mono-neo-acid fed to the rearrangement reaction is substantially free from di-neo carboxylic acid. It is therefore very desirable to be able to remove the di-neo-acid from the mono-neo-acid.

It is disclosed in U.S. Pat. 1,822,016 that polycarboxylic acids may be separated from mono-carboxylic acids by transforming the polycarboxylic acid into the salt while leaving the mono-carboxylic acid in the free state and subjecting the mixture thus obtained to the action of at least one organic solvent for the mono-carboxylic in which the polycarboxylic acid salt is insoluble. The specification of this patent explains that the above process depends on the dissociation constant for one hydrogen atom of the polycarboxylic acid being greater than the dissociation constant of the mono-carboxylic acid. However the dissociation constant, expressed as the pK value is 5.5 for TMO while the first dissociation of TMS has a very similar pK value of 5.3. The method of the U.S. patent further requires careful neutralization of the acids so that only a salt of the polycarboxylic acid is formed.

According to the present invention, the process for separating a mono-neo-acid from a di-neo-acid comprises bringing a solution of the mono- and di-neo-acids in a water-immiscible organic solvent into contact with an aqueous alkaline solution to extract the di-neo acid.

A neo-acid is an acid in which a carboxyl group is linked to a carbon atom whose remaining valencies are all satisfied by carbon atoms.

It is surprising that di-neo-acids can be recovered from mixtures with mono-acids in this way as the dissociation constants are so similar and the mono-neo-acid is often present in the mixtures in a considerably greater amount than the di-neo-acid.

The process for separating the di- and mono-neo acids is particularly useful when applied to the products of reaction between an $\alpha,\omega$-diisoalkyl substituted olefin in which there are at least 3 carbon atoms between isoalkyl carbon atoms, formic acid or carbon monoxide, and concentrated sulphuric acid or to the product of rearranging mono-neo acids to di-neo acids in the presence of concentrated sulphuric acids. The products of such reactions are usually a di-neo acid and a mono-neo acid with one fewer carbon atom than the di-neo acid for example TMS and TMO. The di-neo acid may contain for example 10 to 21 carbon atoms in the molecule and the mono-neo-acid preferably contains one less carbon atom than the di-neo acid.

The aqueous alkaline solution may be a solution of a hydroxide, oxide or carbonate of a Group Ia or IIa metal, an ammonium hydroxide, or carbonate. Ammonium, sodium or potassium hydroxide of strength 1 to 10 molar are preferred.

The amount of aqueous alkaline solution used to be brought into contact with the mixture of mono- and di-neo acid is most desirably at least one equivalent of alkali per mole of the di-neo acid, although a slight excess of alkali, e.g. 1.05 to 1.25 equivalents per mole of di-neo acid, is preferred.

The inert water-immiscible organic solvent may be for example cyclohexane, tetrachloroethylene, carbon tetrachloride, chloroform or a paraffin. Where the mono- and di-neo acids are produced by reaction from an olefin, the olefin is frequently added to the acid catalyst in solution in water-immiscible organic solvent. The mono- and di-neo acid products are normally separated as an organic phase from the catalyst, the organic phase comprising the solvent and the product acids. Where reaction to produce the mono- and di-neo acids also produces an isoparaffin, the organic phase will also contain the isoparaffin. The water-immiscible organic solvent may be the solvent in which the olefin is added to the reaction mixture, or an isoparaffin produced in the course of reaction, or a mixture of both. It is preferred to use about 0.5 to 20 volumes of solvent per volume of neo-acid mixture.

After extraction of the di-neo acid with the aqueous alkaline solution, the aqueous solution may be partitioned with a water-immiscible organic solvent to remove any mono-neo acid which goes into the aqueous solution. Suitable solvents include tetrachloroethylene, carbon tetrachloride, chloroform or an isoparaffin.

The di-neo acid may be recovered from the aqueous alkaline solution by addition of mineral acid.

The invention is further illustrated in the following examples.

EXAMPLE 1

Formic acid (2 mol) and 2,7-dimethyloctene-4 (1 mol) in tetrachloroethylene (100 ml.) were added separately and gradually over 4 h. with stirring and cooling to a round bottom flask (1 l.) which contained 99% w./w. sulphuric acid (300 g.). The reaction temperature was allowed to rise gradually from 0° to 14° C. over the addition. The reaction product was poured onto ice (300 g.) and the precipitated TMS (0.239 mol) was separated by filtration.

The mother liquor acids phase was separated from the catalyst raffinate and was bulked with the mother liquor acids product from a repeat experiment and was washed with (2× 200 ml.). The mother liquor filtrate solution (500 g.) containing TMS (0.0653 mol) and neo undecyclic acids (0.25 mol) dissolved in a mixture of 2,7-dimethyloctane and tetrachloroethylene. The mother liquors were extracted with aqueous 17% w./w. sodium hydroxide (0.2 mol) and the aqueous extract, after back extraction with cyclohexane (50 ml.) was regenerated with excess of mineral acid. The regenerated acid consisted of TMS (0.065 mol) and neo undecyclic acids (0.081 mol). The isolated TMS amounted to 99% of the total originally present and was suitable for recrystallisation to pure TMS.

EXAMPLE 2

Formic acid (59.7 g.) and 2,7-dimethyloctene-4 (140 g.) in tetrachloroethylene (100 ml.) were added separately and gradually over 4 h. with stirring and cooling to a round bottom flask (1 l.) which contained 99% w./w. sulphuric acid (300 g.) The reaction temperature was allowed to rise gradually from 5° to 16° C. over the addition. The reaction product was poured onto ice (300 g.) and the precipitated TMS was separated by filtration, washed with cyclohexane (2× 35 ml.), water (3× 200 ml.) and acetone (50 ml.) and dried (18 h. at 75° C.). The TMS product (0.29 mol) had an acid assay of 99.3% w./w., E.wt. 115).

The initial filtrate was a 2-phase product. The organic phase consisted of tetrachloroethylene, 2,7 - dimethyloctane, 2,2,7-trimethyloctanoic acid and TMS. The organic phase was separated from the aqueous catalyst raffinate and was washed with water (2× 200 ml.). The product was bulked with other mother liquor products produced by similar syntheses, for separation of the mono- and di-neo-acids.

The TMS mother liquor product (500 g.) used in this experiment contained TMS (0.0448 mol) and mono-neo acids (0.278) dissolved in a mixture of 2,7-dimethyloctane in tetrachloroethylene. The mother liquors were extracted with aqueous 20% w./w. sodium hydroxide (0.1 mol) by the procedure described in Example 1 and the regenerated extract yielded a mixture of acids (12.9 g.) which consisted of neo heptanoic acids (0.55% w./w.), neo nonanoic (2.2%), neo undecyclic (21.5%), neo tetradecanoic (0.55%), neo pentadecanoic (0.65%), neo hexadecanoic (0.1%), neo heptadecanoic (0.28%) and TMS (74.2%). The TMS corresponded to approximately 85% of the total originally present in the mother liquors.

EXAMPLE 3

The TMS mother liquor product (4.02 kg.) used in this experiment contained TMS (0.178 mol) and mono-neo acids (2.58 mol) dissolved in a mixture of 2,7-dimethyloctane, cyclohexane and tetrachloroethylene. The mother liquors were extracted with aqueous 20% w./w. sodium hydroxide (0.44 mol) by the procedure described in Example 1 and the regenerated extract yielded a mixture of neo acids (35.8 g.) which consisted of mono-neo acid (11.7% w./w.) and TMS (88.3% w./w). The TMS recovered (0.135 mol) corresponded to 76% of the total TMS originally present in the mother liquors.

EXAMPLE 4

2,7 - dimethyloctene-4 (140 g.) in tetrachloroethylene (100 ml.) was added gradually over 6.5 h. to 99% w./w. sulphuric acid (407 g.) in an autoclave (2 l.) under a pressure of 430 p.s.i.g. of carbon monoxide, with stirring. The temperature of the autoclave contents rose from 17.5° to 22° C. during the addition. The reaction product was poured onto ice (400 g.) and the precipitated TMS was separated by filtration, washed with cyclohexane (2× 35 ml.), water (3× 200 ml.) and acetone (50 ml.) and was dried (18 h.) at 75° C. The TMS product (0.247 mol) had an acid assay of 101% w./w. (E.wt. 115).

The TMS mother liquor product (2.1 kg.) used contained TMS (0.0332 mol) and mono-neo-acids (0.817 mol) dissolved in a mixture of 2,7-dimethyloctane, cyclohexane and tetrachloroethylene.

The mother liquor was extracted with aqueous 2.3% w./w. ammonium hydroxide (0.105 mol) by the procedure described in Example 1 and the regenerated extract yielded a mixture of neo-acids (9.17 g.) which consisted of mono-neo-acids (21% w./w.) and TMS (79% w./w.). The TMS recovered (0.0315 mol) corresponded to 95% of the total TMS originally present.

I claim:

1. A process for separating a di-neo alkanoic acid having 10 to 21 carbon atoms from a mono-neo alkanoic acid having one less carbon atom than the di-neo acid which comprises bringing a solution of the mono- and di-neo acids in a water immiscible inert organic solvent into contact with an aqueous alkaline solution of a hydroxide, oxide or carbonate of a Group Ia or IIa metal, ammonium hydroxide or ammonium carbonate to extract the di-neo acid.

2. The process according to claim 1 wherein the di-neo acid is 2,2,7,7-trimethylsuberic acid and the mono-neo acid is 2,2,7-trimethyloctanoic acid.

3. The process according to claim 1 wherein the solution contains 10 to 20% by wt. of di-neo acid based on mono-neo acid.

4. The process according to claim 1 wherein the alkaline solution is a 1 to 10 molar solution of ammonium, sodium, or potassium hydroxide.

5. The process according to claim 1 wherein the amount of aqueous alkaline solution brought into contact with the mixture of mono- and di-neo acid is such that it contains at least one equivalent of alkali per mole of di-neo acid.

6. The process according to claim 5 wherein the quantity of alkaline solution is such that it contains from 1.05 to 1.25 equivalents per mole of di-neo acid.

7. The process according to claim 1 wherein the water immiscible organic solvent contains tetrachloroethylene.

8. The process according to claim 1 wherein the solvent contains a paraffin.

9. The process according to claim 8 wherein the solvent contains an isoparaffin produced in the course of the reaction giving the mono- and di-neo acids.

10. The process according to claim 1 wherein the mixture of di- and mono-neo acids is dissolved in 0.5 to 20 volumes of solvent per volume of neo-acid mixture.

11. The process according to claim 1 wherein, after bring the aqueous alkaline solution into contact with the mixture of neo-acids, the aqueous alkaline solution is separated from the solvent and partitioned with a water-immisible organic solvent to remove any mono-neo acid.

References Cited

UNITED STATES PATENTS 2,569,984   10/1951   Fetterly _____ 260—419 X
3,489,779   1/1970    Bearden, Jr. _____ 260—419

LEWIS GOTTS, Primary Examiner

E. G. LOVE, Assistant Examiner

U.S. Cl. X.R.

260—537 R, 540